Feb. 16, 1960  H. F. DALGLISH  2,924,974
TEST CIRCUIT CABLES
Filed Feb. 9, 1954  3 Sheets-Sheet 1
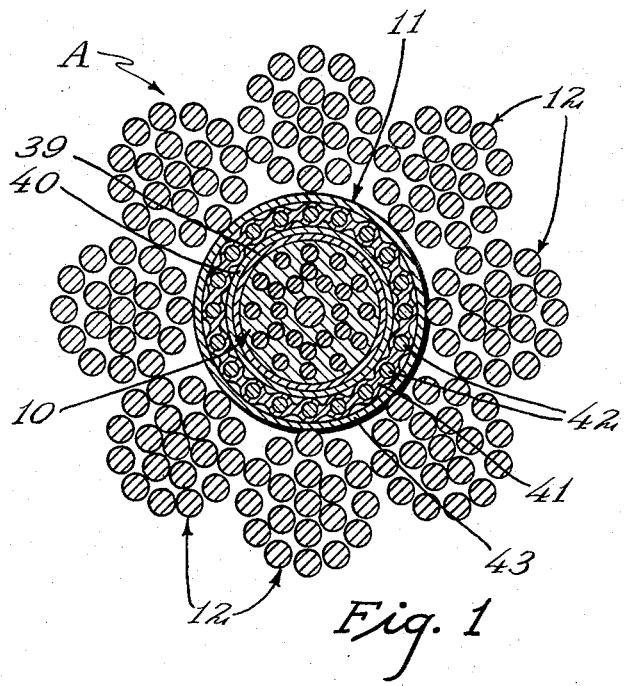
Fig. 1
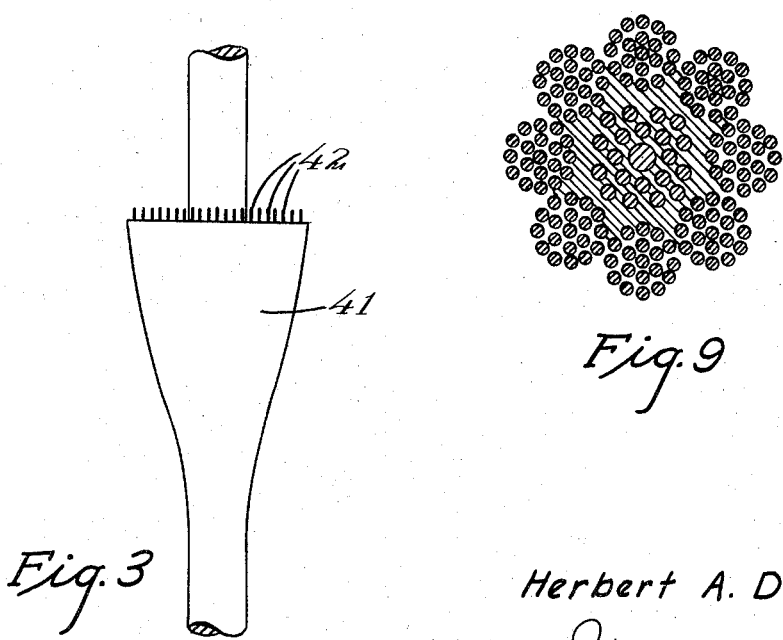
Fig. 3
Fig. 9
INVENTOR
Herbert A. Dalglish
BY Robert M. Dunning
ATTORNEY INVENTOR
Herbert F. Dalglish
BY Robert M. Dunning
ATTORNEY

United States Patent Office 2,924,974
Patented Feb. 16, 1960

2,924,974
TEST CIRCUIT CABLES

Herbert F. Dalglish, St. Paul, Minn.

Application February 9, 1954, Serial No. 409,239

5 Claims. (Cl. 73—341)

This invention relates to an improvement in test circuits and deals particularly with a flexible cable device for measuring temperature at various distances from one or both ends of the cable.

In the storage of various hydrocarbon materials, it is desirable to maintain a check upon the temperature conditions at various points within or about the material stored. For example, in the storage of grain, it is common practice to store this material in elevators which are of considerable height. Varying temperature conditions in the grain are of importance as when the grain reaches a certain temperature, spoilage from one source or another is apt to occur. In the storage of cotton, waste paper, coal or other materials, changes in temperature at various points of the materials stored is indicative of internal combustion or some condition which may be extremely dangerous to the material or to the quality thereof. The present invention relates to a device capable of measuring such temperatures.

Various devices have been provided designed to measure temperature at various elevations in a bin of grain or similar material. In general, these devices have been of two types. Most such devices have been in the nature of thermocouple or thermopile circuits contained within a conduit or pipe. Other such circuits have been contained in a plastic sheath made of nylon.

The object of the present invention is to provide a temperature measuring apparatus which includes a thermocouple or thermopile circuit enclosed within a wire rope. Such a structure has numerous advantages over anything which has been previously devised. In the first place, the wire rope is porous to the extent that the core of the rope which contains the circuits is in more intimate contact with the ambient air. Thus, changes in temperature are much more quickly and readily indicated by the enclosed circuit. Furthermore, such a device has the strength to be self-sustaining and is, therefore, much stronger than previous devices and, accordingly, much less injurious to the circuits enclosed.

The use of a wire rope containing, as a core, thermocouple or thermopile circuits has numerous advantages depending upon the type of material with which they are used. A cable of the type described may be suspended from the top of an elevator and will withstand wear and external forces much better than the rigid pipe or conduit usually employed. When the grain is inserted into, or removed from, the elevator, it exerts a considerable force against any fast or rigid object, due to the swirling movement of the material. A wire rope cable may flex to follow the movement of the grain while a rigid fixed pipe cannot. As a result, considerably less strain is exerted upon the present device than is applied against rigid pipes which have been previously used for a similar purpose.

When used for other hydrocarbon materials including in addition to the previously mentioned materials, wood, peanuts, various maste materials and feed, the flexibility and strength of the cable is also of importance. A wire rope cable may be extended through a pile of waste paper in bales or bundles without ill effects, while a rigid conduit would be quickly broken or bent under similar conditions. For this reason, the use of the circuits in a wire rope is of importance.

A further feature of the present invention resides in the fact that the wire rope cable employing the thermocouple or thermopile circuits is ordinarily less expensive to install than previous devices, and yet is more sensitive and more accurate due to the fact that the ambient air is allowed to penetrate the outer surface of the cable. At the same time, the structure is stronger than previous arrangements and requires considerably less space.

An added feature of the present invention resides in the provision of a thermocouple or thermopile circuit which may be formed continuously and in which indications may be provided at substantially equal distances throughout the length of the cable. The core of the wire rope cable is formed by using a common wire of one metal and a series of wires of a different metal, which extend longitudinally of the core. Each of the wires encircling or extending longitudinally of the common wire is connected to the common wire at substantially equally spaced points throughout the length of the common wire. As a result, the core is capable of measuring temperatures at substantially equal intervals throughout a length of up to approximately twice the distance between the points of connection of each wire with the common wire.

It has been found that if wire of one material is secured to a common wire of another material at two spaced points, temperature measurements may be made from locations beyond these spaced points at opposite ends of the wire and common wire to determine temperature conditions at the above mentioned two spaced points. This principle is employed in the production of a temperature measurement cable of a continuous nature. If the cable contains twenty insulated thermocouple wires of one material, each of which is conductively connected to a common wire of another material at intervals of one hundred feet, and the insulated wires are conductively connected to the common wire at intervals of five feet apart, the temperature may be measured at intervals of five feet throughout the length of a cable up to one hundred ninety-nine feet plus in length. This may be accomplished by taking measurements from both ends of the cable.

An added feature of the present invention resides in the provision of a wire rope having as its core a thermocouple or thermopile network which may, if desired, be enclosed in a wrapping containing a series of conductors. These conductors may be used for connecting the thermocouple wires at one end of the cable to the other end thereof.

In description of the features, and in the following description of the drawings, the thermocouples have been described as located at substantially equally spaced points. It is believed obvious that, while it is usually most desirable to equally space the thermocouples, this is not essential, and the spacing may be unequal if preferred to suit special requirements. The description also relates to a single "common" wire, but under some conditions it is preferable to employ a plurality of common wires instead of the single common wire mentioned.

In describing the device as comprising a wire rope having a series of thermocouple circuits in its core, it is not desired to limit the nature of the outer portion of the rope to any particular form or arrangement. In other words, the metallic wires which enclose the core may be laid, twisted or braided and may be formed of any other construction which will permit air to enter the coil.

These and other objects and novel features of the invention will be more clearly and fully set forth in the following specification and claims.

In the drawings forming a part of the present invention:

Figure 1 is a cross sectional view through a wire rope or cable indicating the manner in which the present invention may be accomplished.

Figure 3 is a diagrammatic view showing the manner in which the cable core may be wrapped so that readings from both ends of the cable may be obtained from a single end thereof.

Figure 9 is a cross sectional view through a wire rope similar to that previously described but in which a plastic covering is applied over the circuit wires.

Figure 2:
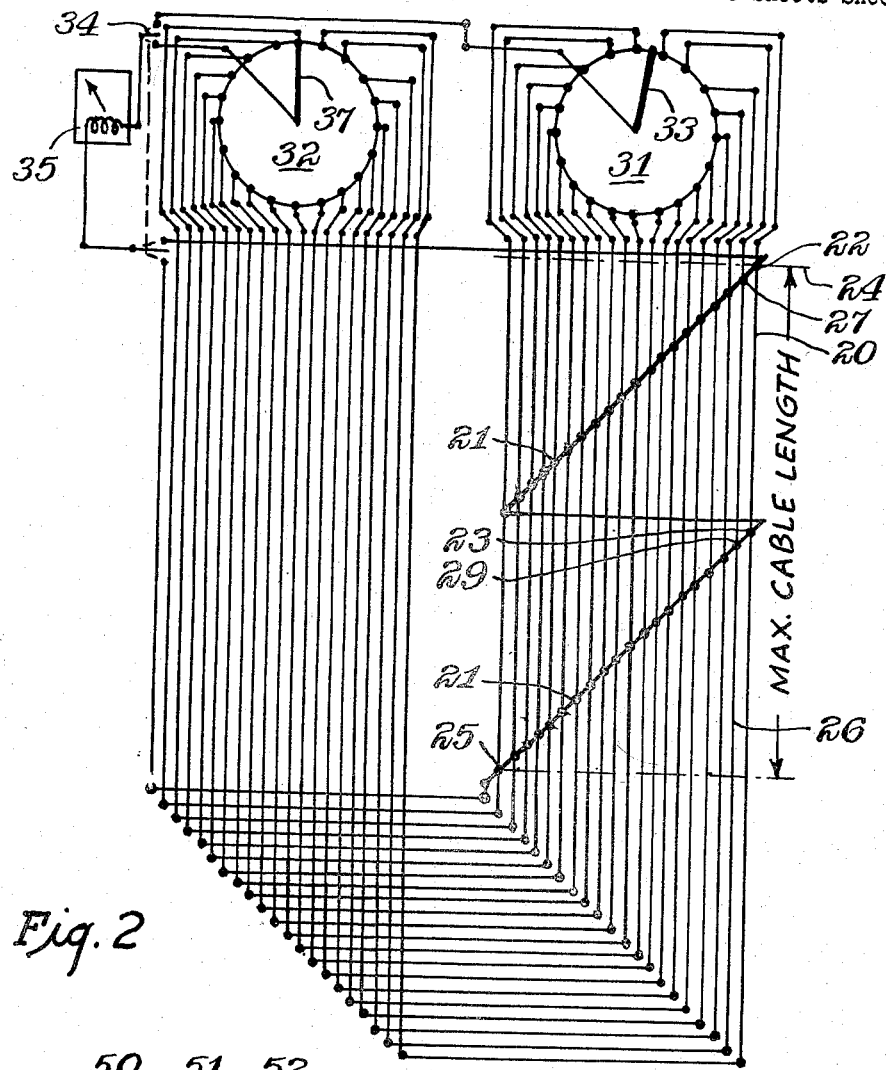
Figure 2 is a diagrammatic view showing the wiring of the cable in its more complicated form.

A typical cross sectional view of the cable described in the present invention is shown at A in Figure 1 of the drawings. This view shows a core, illustrated in general by the numeral 10, encircling the individual wires of the core. About the periphery of the core 10 is a coating of insulating material, shown in general by the numeral 11. About the periphery of the insulation 11 is a wire rope, illustrated in general by the numeral 12. It is the circuit bearing core 10, the insulation layer 11, and the wire rope covering 12, which form the basis of the present invention, although there are other features which are also of advantage.

Figure 4:
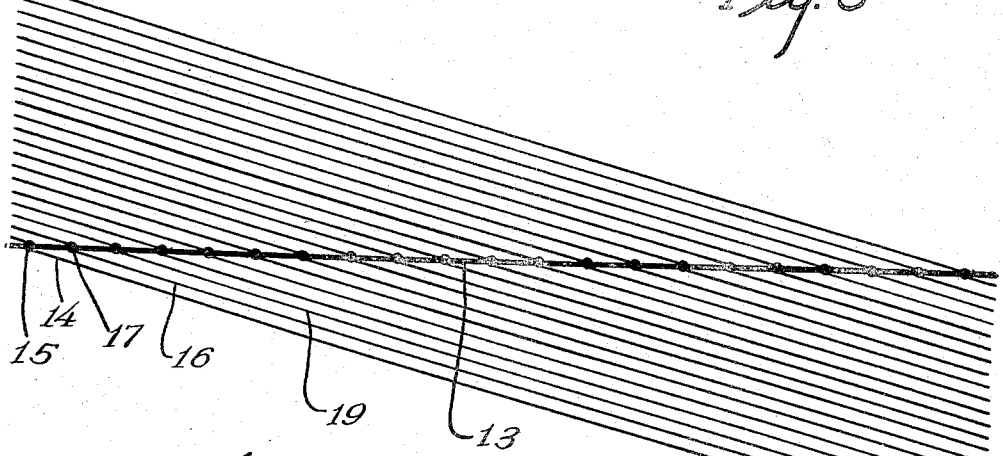
Figure 4 is a diagrammatic view showing the manner in which the single wires may be secured to the main wire.

The wire core is preferably formed as best illustrated in Figures 2 and 4 of the drawings. Figure 4 disclosed a common wire 13 of one metallic material such as that commonly known as constantan. The remaining wires, which are connected to the common wires at substantially equal or predetermined intervals is of another metallic material, such as that known as Formvar or Formex type insulated copper. These wires have been previously used in forming thermocouples or thermopiles, and are not a part of the present invention. Other combinations of metallic wires may be substituted, together with their advantages and disadvantages.

As shown in Figure 4 of the drawings, a wire of one material such as 14 is connected to the common wire 13 to extend in both directions from the point of connection. It is believed obvious that the connection 15 between the wire 14 and the common wire 13 forms a thermocouple which may be read from either end of the wires 13 and 14. The next wire 16 is connected to the common wire 13 at a point 17 spaced along the common wire from the point of connection 15 substantially a predetermined distance. The next wire 19 is connected to the common wire 13 at a substantially equal distance along the common wire to the distance between the points of connection 15 and 17. In a similar manner, any desired number of wires may be connected to the common wire along the length thereof, the points of connection being at predetermined intervals. Each wire preferably extends the full length of the common wire 13, so that the temperature conditions at any point along the length of the common wire may be measured from either end of the cable.

In the preferred form of this invention, the common wire is connected to the cooperable wires of different metallic material at predetermined intervals. In other words, all of the wires extend the full length of the cable. If the first or common wire is defined as the common or primary wire, the wires of other material forming the thermocouples or thermopiles may be described as the secondary wires. The number of thermocouples in the finished structure depends upon the number of times the secondary wires embodied in the core are connected to the primary wire. If the core is considered to have a single primary wire and twenty secondary wires, obviously there may be twenty thermocouples in the cable core if each is connected once. Each of the secondary wires is connected to the common wire at predetermined distances. For example, in the core having twenty secondary wires, each secondary wire may be connected to the common wire at intervals of one hundred feet, and if the secondary wires are connected to the common wire at intervals of five feet, a temperature reading is obtainable at each interval of five feet along the length of the common wire.

This arrangement has advantages not immediately appreciated. In the first place, by having each secondary wire extend the full length of the common wire, the core is of equal thickness throughout its length. In the second place, this arrangement permits the reading of temperatures at predetermined intervals up to practically twice the distance between connections of the secondary wires to the common wire. Stated otherwise, if twenty secondary wires are connected to the common wire at intervals of five feet, temperatures may be measured at five foot intervals throughout a cable of substantially two hundred feet in length, if readings are taken from both ends of the cable. This is not an obvious conclusion, but one which has been discovered.

With reference to Figure 2 of the drawings, the cable is diagrammatically illustrated at A. A length of cable is shown which is twice the length of the distances between the points of connection between the secondary wires and the primary wires. During this length of wire rope, each secondary wire is connected to the common wire twice. A first wire 20 is connected to the common wire 21 at points 22 and 23, which may be, for example, one hundred feet apart. The first connection is five feet from the upper end 24 of the circuitry, while the second connection is one hundred feet therefrom, or ninety-five feet from the lower end 25 of the structure. By measuring from the upper end of the cable, a temperature reading at an elevation of five feet from the end 24 of the circuit may be obtained, and by measuring from the other end 25 of the circuit, a temperature reading at the point 23, ninety-five feet from the end 25 may be obtained.

Similarly, the second wire 26 is connected to the common wire 21 at a point 27 ten feet from the circuit end 24 and at a point 29 one hundred ten feet from the end 24, or ninety feet from the rope end 25. As a result, temperatures may be read at each point 27 and 29, one reading being obtained from one end of the network and the other reading being obtained from the end thereof. The fact that the two points of connection are also connected does not change the results obtained materially, as the thermocouple reading at either end of the cable is obtained between the end of the circuitry and the nearest junction of any secondary wire with the primary wire.

The need for a detailed description of all of the wires of the system should be obviated by the foregoing general description. Each of the secondary wires is connected to the common wire at substantially equal intervals, and the distance between the points of connection of the secondary wires and the common wire is also substantially equal. In the particular construction described, readings in the upper portion of the cable may be obtained at intervals of five feet from the upper end 24 of the circuit, and readings in the lower portion of the circuit may be obtained at intervals of five feet from the lower end 25 of the circuit. In describing such an arrangement, the term "upper" used in conjunction with the circuit and identified by the numeral 24, as well as the term "lower" used with the numeral 25, merely describe locations on the drawings where one of them is above the other; in actual practice, the finished structure may be horizontal or inclined, as well as vertical.

As also shown in Figure 2 of the drawings, each end of the circuit may be connected to an apparatus for indicating temperatures at the various junctures of the common wire and the secondary wires. A rotary switch 31 is connected to the secondary wires at the end 24 of the circuitry and a second rotary switch 32 is connected to the other end 25 thereof. The wires are connected in the obvious manner to contact points about the periphery of the switch, while the rotary arm 33, of switch 31, is connected through the selector switch 34 to the galvanometer or other indicating device 35; the other terminal of which is connected to the common wire 21. The selector switch 34 selects the switch to be connected to the galvanometer, and the rotary arm of either the described switch 31, or to the companion rotary switch 32 having a rotary arm 37. In the particular construction described, the temperature may be determined at intervals of five feet throughout the length of practically two hundred feet. Obviously, these figures are stated only as an example, and the intervals between connections of the common wire, or wires, with the secondary wires, as well as the number of secondary wires and common wires employed, may be varied considerably depending upon the requirements of any particular job.

In the formation of the wire rope test cable A the core may be formed continuously by extending the number of wires employed throughout the length of the wire rope and connecting each individual wire to the common wire at equal intervals. The core thus formed may be coated with a plastic coating to insulate the core from the wire rope. This may be done in various ways. In Figure 1 of the drawings the core is covered with a series of layers of insulation indicated by the numerals 39 and 40 and the core may then be wrapped with a sheet of insulation 41 having a series of spaced wire conductors 42 extending throughout the length thereof. These wires 42 may be embodied in a flat ribbon of insulation of the type commonly used for TV aerial lead-in wire or the like. This ribbon may be wrapped about the core in the manner of Figure 3 of the drawings so that the wires 42 are spaced about the periphery of the core. The wires 42 may be equal in number to the wires forming the thermocouple or thermopile circuits within the core. If desired the ribbon 41 may be covered with a layer of insulation 43 and the core is then encircled by the wire rope strands 12, each of which is composed of a plurality of wires.

The purpose of the ribbon or tape 41 and the wires 42 is to provide a means of connecting the circuit wires at one end of the wire rope to the other end thereof. In other words, in the example previously described, if the test cable is more than one hundred feet in length, the conductors 42 may be used to connect the thermocouple wires at one end of the cable to instruments at the other end of the cable. Thus, the lower end of the cable need not be tied down, when used vertically, or separate conductors need not be connected to the lower end of the cable to provide readings of temperature in the second one hundred feet of cable.

This arrangement has the advantage that instruments may be provided at one end only of the cable even though the cable be in excess of one hundred feet in length. Here again, it must be remembered that the one hundred feet mentioned in the example is only for the purpose of illustration.

In a modified form of construction the core may be covered by a coating of plastic, or the like, which may be sprayed or extruded onto the surface of the core, may be applied by dipping the core through the coating solution or may be applied in any other manner. If a proper coating is applied, the core may be formed into the wire rope and the circuit wires may be insulated from the metal covering.

Figure 7:
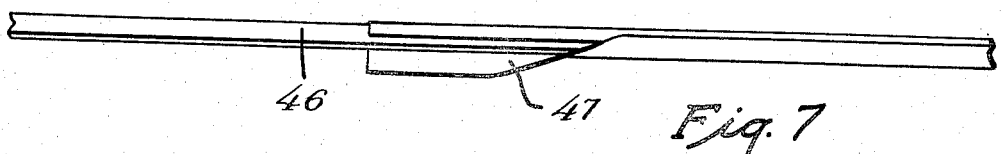
Figure 7 shows the manner in which a third wrapping may be applied about the second wrapping to improve the insulation qualities of the core.
Figure 6:
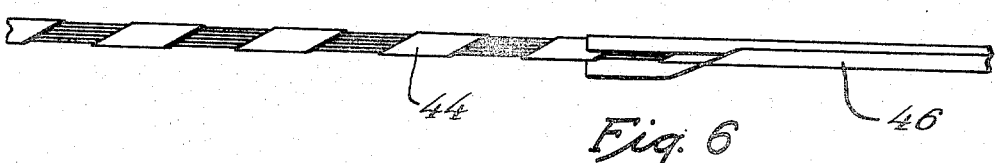
Figure 6 is a view showing the manner in which a second sheath may be applied over the first covering.
Figure 5:
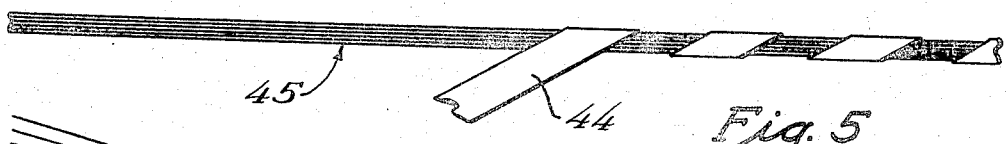
Figure 5 shows the manner in which the circuit wires may be wrapped with the first wrapping.

In Figures 5 through 8 of the drawings, I disclose a modified form of construction in which the core is provided with a series of insulation coverings. In the arrangement shown in Figure 5, a paper tape 44 may be wrapped spirally about the core which is indicated in general by the numeral 45. A paper tape 46 may then be folded around the wrapped core in Figure 6. A plastic tape 47 may then be wrapped about the paper tape wrapping 46 as shown in Figure 7. The product of Figure 7 is then spirally wrapped with a tape 49 possessing electrical insulation properties. This product may be used or may be further coated or processed.

The wire rope cable thus formed has numerous advantages from a construction and use standpoint. The test cable thus formed is readily flexible and may be suspended in a bin or tank of grain or extended through piles of material for use in indicating temperature at various points along the cable. When used in a grain elevator the cable will last considerably longer than test circuits enclosed in rigid pipes due to the fact that the cable may flex with the flow of the grain thus decreasing the abrasive action and resistance pull of the grain. The cable is not subjected to the same twisting forces which will be found in rigid conduits because of this property of the cable to flex upon being subjected to pressure. Furthermore, the cable is of relatively small diameter as compared with rigid conduits as previously used. Five-sixteenth inch, three-eighths, or one-half inch diameter wire rope cable may be effectively used for the purpose in place of a rigid conduit of perhaps three-quarter inch width with joints one and one-half inch in outside diameter.

Figure 10:
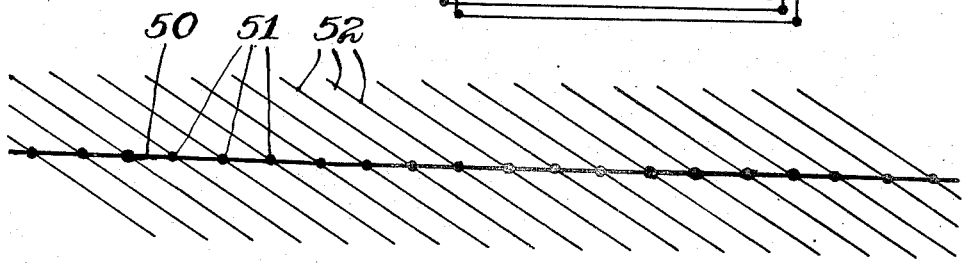
Figure 10 is a diagrammatic view of an alternate construction.
Figure 8:
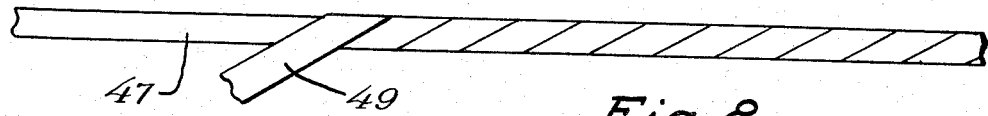
Figure 8 shows a wrapping which may be applied over the previously described coverings.

If it is preferred the outer cable 50 may be used as the common wire of the circuits. Such an arrangement, illustrated in Figure 10, has the advantage that the junctions 51 between the individual secondary wires 52 and the primary common wire are exposed to ambient aair. Due to the fact that all of the strands of the wire rope are in intimate contact, they comprise a single conductor, and the junctions may be formed with any of the strands of the wire rope. The arrangement has the disadvantage that it is somewhat less efficient than thermocouples constructed of constantan and copper, and also that under present methods of construction it is somewhat more difficult to construct. However, when the cable is made in this manner it will function effectively and produce temperature measurements.

Again it should be stressed that the particular arrangement of the metallic wires of the cable is not important and that these wires may be laid twisted or braided as long as they provide the covering sheath which provides the necessary tensile strength and resistance to abrasion.

Not only is the present cable structure the strongest on the market but it is also the most sensitive and accurate due to the nature of the construction. The plastics and insulation materials employed are much better conductors of heat than is the nylon used for covering thermocouple circuits which have been previously constructed. In other words the nylon covered circuits previously used had to be made of a plastic which was strong enough to withstand the forces exerted upon it and as a result the plastics had to be thick and of material possessing high heat insulation properties. In the present arrangement the wire cable merely supports the core and the covering of the core is only to insulate the wires from the outer wires forming the rope.

In accordance with the patent statutes, the principles of construction and operation of the test circuit cables have been described and while it has been endeavored to set forth the best embodiments thereof, it is desired to have it understood that obvious changes may be made within the scope of the following claims without departing from the spirit of the present invention.

I claim:
1. A device of the class described and including a series of metal strands forming a wire rope cable having a core therein, said core including a conductive common wire of one material and a series of conductive wires of a second material, each of said wires of the series being connected to said common wire at substantially equally longitudinally spaced points, each of the wires of the series being connected at a second point to the common wire between each of the spaced points of first connection between any one wire of the series and said common wire, the points of connection being substantially equally spaced along the common wire, and means connected to each end of said series of wires and said common wire for reading temperature at the nearest junction of each wire of the series and said common wire.

2. The structure described in claim 1 and including a series of auxiliary insulated conductors forming a part of the core, each connected to a corresponding wire of said series at an end thereof.

3. The structure defined in claim 1 and including a sheath encircling said core and including a series of auxiliary insulated conductors in electrically insulated relation, each connected to a corresponding wire of said series at an end thereof.

4. A thermocouple structure including a series of wires of one material, a common wire of different material, a junction between each wire of the series and the common wire, the wires of the series being connected in order and the junctions being substantially equally spaced, a second junction between each of the wires of the series and the common wire in the same order as mentioned above, and means connected to each end of said series of wires and said common wire for reading temperature at the nearest junction of each wire of the series and said common wire.

5. A thermocouple structure including a series of wires of one material, a common wire of a different material, a junction between each wire of the series, and the common wire, the wires of the series being connected in order and the junctions being substantially equally spaced, a second junction between at least some of the wires of the series and the common wire in the same order as mentioned above, and means connected to one end of said series of wires and said common wire, and to the other end of each wire having a second junction and the other end of said common wire for reading temperature at the nearest junction of each wire of the series and said common wire.

References Cited in the file of this patent

UNITED STATES PATENTS

| 2,665,322 | MacDonald | Jan. 5, 1954 |

FOREIGN PATENTS

| 692,641 | Germany | June 24, 1940 |
| 674,068 | Great Britain | June 18, 1952 |